(12) United States Patent
Tomita

(10) Patent No.: US 6,995,776 B2
(45) Date of Patent: Feb. 7, 2006

(54) TERMINAL DEVICE, INFORMATION DISPLAY METHOD, AND PROGRAM FOR SAID INFORMATION DISPLAY METHOD

(75) Inventor: Kazunori Tomita, Tokyo (JP)

(73) Assignee: NEC Corporation, Tokyo (JP)

( * ) Notice: Subject to any disclaimer, the term of this patent is extended or adjusted under 35 U.S.C. 154(b) by 47 days.

(21) Appl. No.: 10/293,468

(22) Filed: Nov. 14, 2002

(65) Prior Publication Data

US 2003/0090495 A1 May 15, 2003

(30) Foreign Application Priority Data

Nov. 14, 2001 (JP) .............................. 2001-349372

(51) Int. Cl.
G09G 5/00 (2006.01)

(52) U.S. Cl. ..................... 345/619; 345/659; 345/629; 345/660; 345/672; 345/652; 345/655

(58) Field of Classification Search ................ 345/619, 345/659, 629, 660, 672, 652, 655
See application file for complete search history.

(56) References Cited

U.S. PATENT DOCUMENTS

| | | | |
|---|---|---|---|
| 6,268,857 B1 * | 7/2001 | Fishkin et al. .............. 345/863 |
| 6,388,684 B1 * | 5/2002 | Iwamura et al. ............. 715/788 |
| 6,450,647 B1 * | 9/2002 | Takeuchi ...................... 353/69 |
| 6,567,101 B1 * | 5/2003 | Thomas ....................... 345/649 |
| 6,628,255 B1 * | 9/2003 | Ferrel et al. .................. 345/88 |
| 2002/0021278 A1 * | 2/2002 | Hinckley et al. ........... 345/156 |
| 2002/0090119 A1 * | 7/2002 | Saito et al. ................. 382/128 |

FOREIGN PATENT DOCUMENTS

| | | |
|---|---|---|
| JP | 7-64754 | 3/1995 |
| JP | 7-240883 | 9/1995 |
| JP | 7-244568 | 9/1995 |
| JP | 7-271505 | 10/1995 |
| JP | 10-240434 | 9/1998 |
| JP | 10-240436 | 9/1998 |
| JP | 11-327730 | 11/1999 |
| JP | 2000-47813 | 2/2000 |
| JP | 2001-36627 | 2/2001 |
| JP | 2001-216063 | 8/2001 |
| JP | 2001-228857 | 8/2001 |

* cited by examiner

Primary Examiner—Matthew C. Bella
Assistant Examiner—Mike Rahmjoo
(74) Attorney, Agent, or Firm—Young & Thompson

(57) ABSTRACT

A terminal device detects the inclination of the terminal device per se in a predetermined direction, and, based on the detected inclination, changes the display format of an element object on a display screen or enlarges/regenerates an element object on a display screen.

4 Claims, 7 Drawing Sheets

TERMINAL DEVICE, INFORMATION DISPLAY METHOD, AND PROGRAM FOR SAID INFORMATION DISPLAY METHOD

FIELD OF THE INVENTION

The invention relates to a terminal device, a screen display method, and a program for said screen display method and more particularly to a terminal device, a screen display method, and a program for said screen display method wherein an object on a display screen is enlarged/regenerated based on a detected inclination angle.

BACKGROUND OF THE INVENTION

Terminal devices, which can be utilized in a wireless mobile environment, have spread and have become used as necessities in daily life. Regarding such terminal devices, the following proposals have hitherto been made.

Japanese Patent Laid-Open No. 36627/2001 discloses a mobile wireless terminal device (hereinafter referred to as "prior art 1") wherein, upon the depression of a function key for realizing a predetermined function, guidance information on the depressed function key is displayed/enlarged on a screen in the mobile wireless terminal device.

Japanese Patent Laid-Open No. 327730/1999 discloses an information display method and a portable information terminal device (hereinafter referred to as "prior art 2") wherein, as soon as a predetermined region on a touch panel provided in a portable information terminal device is touched by a pen, an image displayed on the predetermined region is displayed in an enlarged state.

Japanese Patent Laid-Open No. 228857/2001 discloses an image display device and an image display method (hereinafter referred to as "prior art 3") wherein, when the original size of image data is larger than the available display region in the display screen, the image data is thinned to resize the data to a size suitable for the display screen.

In mobile terminal devices, such as portable telephones (cellular phones), wherein the display area is limited, contents such that priority has been given to design in which texts, images, tables, pictures and the like are freely utilized, as seen in ordinary webs, cannot be properly displayed in the originally contemplated form even when the mobile terminal devices have the function of displaying individual element objects.

In prior art 1, in order to display guidance information on a predetermined function, the corresponding function key should be found and depressed.

In prior art 2, in order to display, in an enlarged state, characters, figures or the like disposed on the touch panel in its predetermined region, a touch pen should be provided to indicate the predetermined region.

In prior art 3, since the original image data is displayed in a thinned state, there is a possibility that the displayed image is different from the original image.

SUMMARY OF THE INVENTION

The invention has been made under these circumstances, and it is an object of the invention to provide a terminal device, an information display method, and a program for the information display method targeted to multimedia, which can realize an appreciation of texts and other individual objects, such as images, tables, and pictures, contained in contents of media-rich webs in a proper and simple manner at any place.

The above objects can be attained by the following features of the invention.

(1) A terminal device wherein the inclination of the terminal device per se in a predetermined direction is detected and the display format of an element object on a display screen is changed based on the detected inclination.

(2) A terminal device wherein the inclination of the terminal device per se in a predetermined direction is detected and an element object on a display screen is enlarged/regenerated based on the detected inclination.

(3) The terminal device according to the above item (2), wherein, after the enlargement/regeneration of the element object, upon the detection of inclination of the terminal device per se in another direction, the screen is returned to the state before the enlargement/regeneration of the element object.

(4) A terminal device comprising: element object detection means for detecting element objects contained in input display information; display format determination means for determining the display format of the element objects based on the type of the element objects detected by the element object detection means; display position registration means for registering the display position of the element objects, detected by the element object detection means, on a screen; element object display means for displaying the element objects on the screen based on the display format determination means and the display position registration means; inclination detection means for detecting the inclination of the terminal device per se; and element object enlargement/regeneration means for enlarging/regenerating the displayed element object based on the predetermined inclination detected by the inclination detection means.

(5) The terminal device according to the above item (4), wherein the element object enlargement/regeneration means determines, based on the detected inclination in a predetermined direction, the element object to be enlarged among the element objects of which the display positions are registered in the display position registration means, then enlarges the element object, and displays a display layer, in which the enlarged element object is displayed, in the state of superimposition on a display layer on which the element object before the enlargement is displayed.

(6) The terminal device according to the above item (4) or (5), which further comprises display returning means that, when the inclination of the terminal device per se in another direction has been detected by the inclination detection means after the enlargement/regeneration of the element object by the element object enlargement/regeneration means, returns the enlarged/regenerated element object to the display before the enlargement/regeneration.

(7) The terminal device according to the above item (6), wherein, upon the detection of inclination in a direction opposite to the predetermined direction, the display returning means returns the enlarged/regenerated element object to the display before the enlargement/regeneration.

(8) The terminal device according to any one of the above items (4) to (7), wherein, when the detected element object is a static image, a moving image, or voice information, the element object display means converts the detected element object to an icon by which information inherent in the detected element object is simply displayed.

(9) The terminal device according to the above item (8), which further comprises display element object number setting means for setting, based on the display size of the screen, the number of element objects, indicated in the icon form, arrayed by the element object display means in the lateral direction on the screen.

(10) An information display method wherein the inclination of a terminal device in a predetermined direction is detected and the display format of an element object on a display screen is changed based on the detected inclination.

(11) An information display method wherein the inclination of the terminal device in a predetermined direction is detected and an element object on a display screen is enlarged/regenerated based on the detected inclination.

(12) The information display method according to the above item (11), wherein, after the enlargement/regeneration of the element object, upon the detection of inclination of the terminal device in another direction, the screen is returned to the state before the enlargement/regeneration of the element object.

(13) An information display method comprising the steps of: detecting element objects contained in input display information (element object detection step); determining the display format of the element objects based on the type of the element objects detected by the element object detection step (display format determination step); registering the display position of the element objects, detected by the element object detection step, on a screen (display position registration step); displaying the element objects on the screen based on the display format determination step and the display position registration step (element object display step); detecting the inclination of a terminal device (inclination detection step); and enlarging/regenerating the displayed element object based on the predetermined inclination detected by the inclination detection step (element object enlargement/regeneration step).

(14) The information display method according to the above item (13), wherein the element object enlargement/regeneration step determines, based on the detected inclination in a predetermined direction, the element object to be enlarged among the element objects of which the display positions are registered by the display position registration step, then enlarges the element object, and displays a display layer, in which the enlarged element object is displayed, in the state of superimposition on a display layer on which the element object before the enlargement is displayed.

(15) The information display method according to the above item (13) or (14), which further comprises display returning step that, when the inclination of the terminal device in another direction has been detected in the inclination detection step after the enlargement/regeneration of the element object by the element object enlargement/regeneration step, returns the enlarged/regenerated element object to the display before the enlargement/regeneration.

(16) The information display method according to the above item (15), wherein, upon the detection of inclination of the terminal device in a direction opposite to the predetermined direction, the display returning step returns the enlarged/regenerated element object to the display before the enlargement/regeneration.

(17) The information display method according to any one of the above items (13) to (16), wherein, when the detected element object is a static image, a moving image, or voice information, the element object display step converts the detected element object to an icon by which information inherent in the detected element object is simply displayed.

(18) The information display method according to the above item (17), which further comprises display element object number setting step for setting, based on the display size of the screen, the number of element objects, indicated in the icon form, arrayed by the element object display step in the lateral direction on the screen.

(19) A program for execution by a computer, comprising an instruction for executing processing for detecting the inclination of a terminal device in a predetermined direction and for changing the display format of an element object on a display screen based on the detected inclination.

(20) A program for execution by a computer, comprising an instruction for executing processing for detecting the inclination of the terminal device in a predetermined direction and for enlarging/regenerating an element object on a display screen based on the detected inclination.

(21) The program according to the above item (20), which further comprises an instruction for allowing the computer to execute processing that, after the enlargement/regeneration of the element object, upon the detection of inclination of the terminal device in another direction, returns the screen to the state before the enlargement/regeneration of the element object.

(22) A program for execution by a computer, comprising an instruction for executing: processing for detecting element objects contained in input display information (element object detection processing); processing for determining the display format of the element objects based on the type of the element objects detected by the element object detection processing (display format determination processing); processing for registering the display position of the element objects, detected by the element object detection processing, on a screen (display position registration processing); processing for displaying the element objects on the screen based on the display format determination processing and the display position registration processing (element object display processing); processing for detecting the inclination of a terminal device (inclination detection processing); and processing for enlarging/regenerating the displayed element object based on the predetermined inclination detected by the inclination detection processing (element object enlargement/regeneration processing).

(23) The program according to the above item (22), wherein the element object enlargement/regeneration processing determines, based on the detected inclination in a predetermined direction, the element object to be enlarged among the element objects of which the display positions are registered in the display position registration processing, then enlarges the element object, and displays a display layer, in which the enlarged element object is displayed, in the state of superimposition on a display layer on which the element object before the enlargement is displayed.

(24) The program according to the above item (22) or (23), which further comprises an instruction for allowing the computer to execute processing that, when the inclination of the terminal device in another direction has been detected by the inclination detection processing after the enlargement/regeneration of the element object by the element object enlargement/regeneration processing, returns the enlarged/regenerated element object to the display before the enlargement/regeneration (display returning processing).

(25) The program according to the above item (24), wherein, upon the detection of inclination in a direction opposite to the predetermined direction, the display returning processing returns the enlarged/regenerated element object to the display before the enlargement/regeneration.

(26) The program according to any one of the above items (22) to (25), wherein, when the detected element object is a static image, a moving image, or voice information, the element object display processing converts the detected element object to an icon by which information inherent in the detected element object is simply displayed.

(27) The program according to the above item (26), which further comprises an instruction for allowing the computer to execute processing for setting, based on the display size of the screen, the number of element objects, indicated in the icon form, arrayed by the element object display processing in the lateral direction on the screen (display element object number setting processing).

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the invention will be explained in conjunction with the accompanying drawings.

Figure 1:
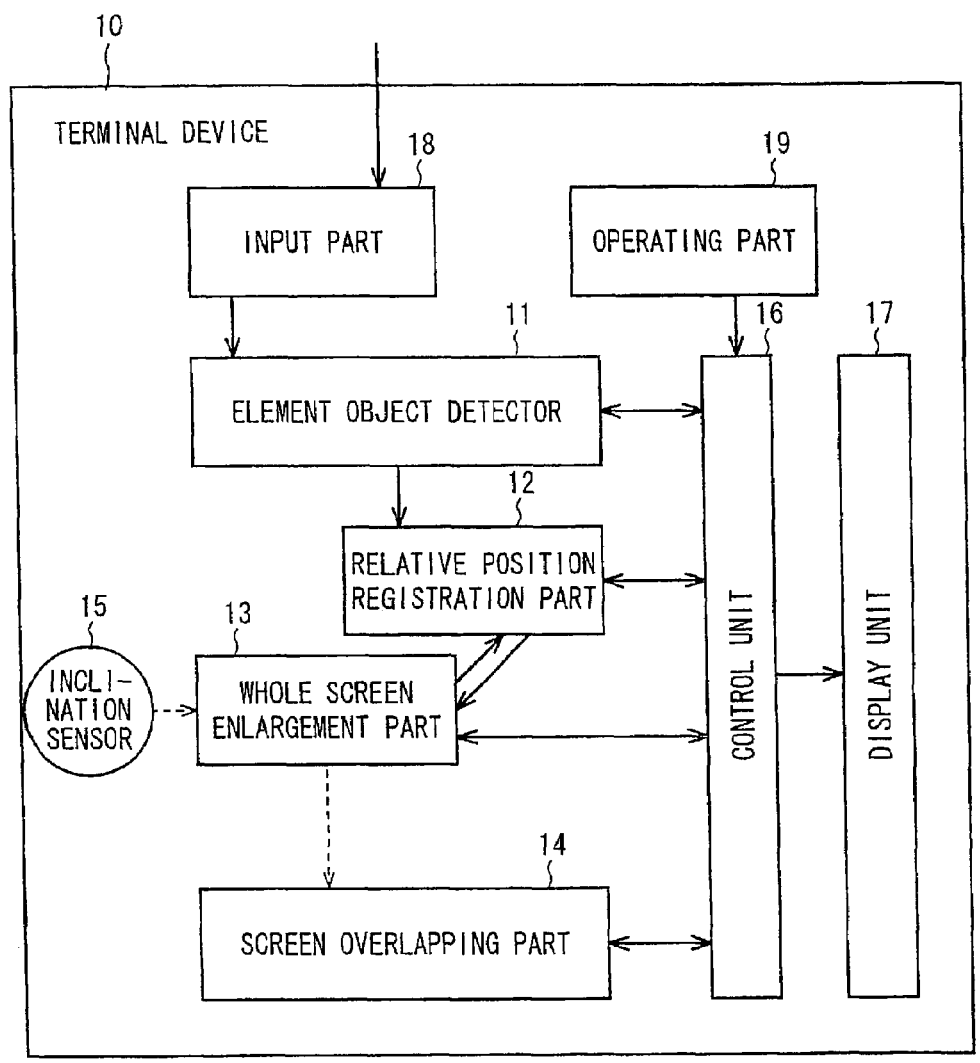
FIG. 1 is a diagram showing the construction of a terminal device in a preferred embodiment of the invention.

FIG. 1 is a diagram showing the construction of a terminal device 10 in a preferred embodiment of the invention. The construction and the operation of the terminal device 10 in the preferred embodiment of the invention will be explained in conjunction with FIG. 1.

The terminal device 10 may be a portable telephone, or alternatively may be PHS or PDA. Further, the terminal device 10 may be other equipment so far as the device has a construction which can attain the following effects.

The terminal device 10 comprises an element object detector 11, a relative position registration part 12, a whole screen enlargement part 13, a screen overlapping part 14, an inclination sensor 15, a control unit 16, a display unit 17, an input part 18, and an operating part 19.

The control unit 16 is connected to the element object detector 11, the relative position registration part 12, the whole screen enlargement part 13, the screen overlapping part 14, and the display unit 17 and controls the individual parts, in the terminal device 10, including the element object detector 11, the relative position registration part 12, the whole screen enlargement part 13, the screen overlapping part 14, and the display unit 17.

The input part 18 permits the input of information through wire or wireless means. In this preferred embodiment, the input information will be hereinafter explained as web contents.

The element object detector 11 analyzes the structure of ML (markup language) in the web contents introduced through the input part 18. Next, the element object detector 11 recognizes element objects contained in the web contents based on the results of analysis of the ML structure. Element objects include texts, images, tables, voice information, and pictures constituting the web contents.

The element object detector 11 prepares display images for displaying the element objects on the display unit 17. The element object detector 11 prepares a display image of a text using the recognized text as a display image of the text.

Further, in preparing display images of element objects other than texts, such as images, tables, voice information, or pictures, the element object detector 11 replaces the element objects other than the text with simple icons, which can recognize the element objects other than the text, and uses the simple icons as display images of the element objects other than the text.

In the case of element objects having a larger amount of information than texts, such as images, tables, voice information, or pictures, for some terminal devices, since there is a limitation on the area size of the display, these element objects sometimes cannot be entirely displayed without difficulties. For this reason, element objects having a large amount of information are replaced by simple icons which are simply displayed. The following forms of the simple icon are considered useful. When the element objects are images and the like, a contracted image may be used as the simple icon. Further, in element objects such as tables, voice information, or pictures, simple characters, symbols, or images representing the contents of information on the element object can be used as the simple icon. Upon the selection of a simple icon, the enlargement of the selected simple icon or the regeneration of the contents of information of the element object corresponding to the selected simple icon is carried out.

At the same time that the element object detector 11 has prepared the display image, the relative position registration part 12 registers the position of the display of the element objects on the display unit 17.

Figure 2:
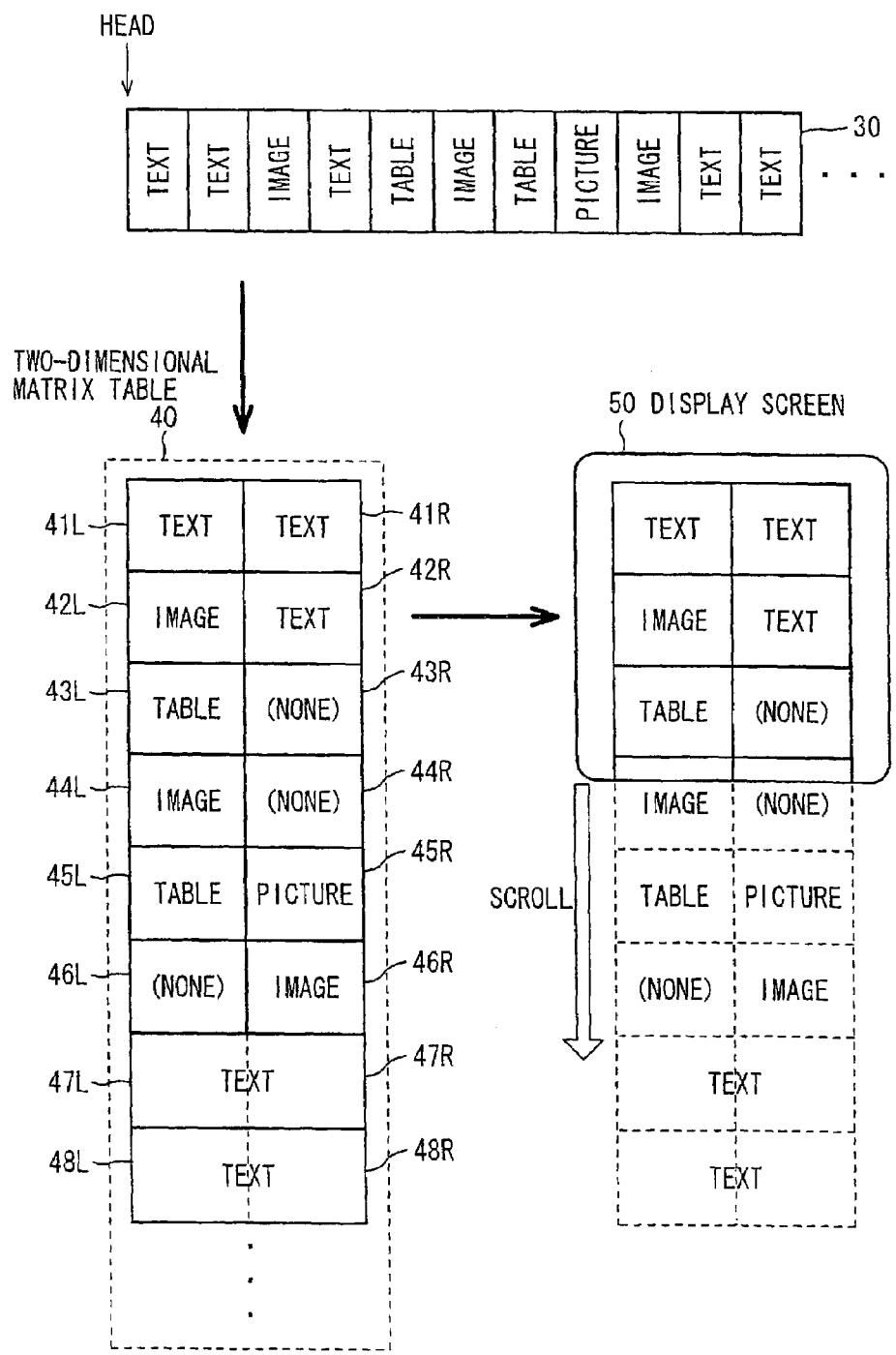
FIG. 2 is a diagram showing display processing of element objects in a terminal device in a preferred embodiment of the invention.

FIG. 2 is a diagram showing the operation for displaying element objects by a terminal device 10 in a preferred embodiment of the invention. The operation for displaying element objects by the terminal device 10 in a preferred embodiment of the invention will be explained in conjunction with FIGS. 1 and 2.

A group of element objects 30 are a set of element objects read from input web contents by the element object detector 11. As shown in FIG. 2, it is assumed that the element objects have been read in the order of text, text, image, text, table, image, table, picture, image, text, and text.

The relative position registration part 12 registers the positional relationship of the read element objects on the display unit 17 in a two-dimensional matrix table 40 possessed by the relative position registration part 12 per se. The two-dimensional matrix table has registration regions 41L to 48L and 41R to 48R. The two-dimensional matrix table 40 is a matrix table of N lines, wherein N is an integer of 1 or more, by 2 columns. The "two columns" are due to the limitation of the display screen size in the display unit 17. Although the number of columns in this preferred embodiment is 2, the number of "columns" may be any number based on the display screen size.

As shown in FIG. 2, for example, the element objects are registered in the order of reading in registration regions in the order of 41L→41R→42L→22 42R→43L→43R→44L→44R

→45L→45R→46L→46R→47L→47R→48L→48R→ . . . .

That is, when reading is carried out in the order of "text, text, image, text . . . ," registration is carried out in the order of "text in the registration region 41L, text in the registration region 41R, image in the registration region 42L, text in the registration region 42R . . . ." In the position (such as 43R) in which (None) has been registered, any element object is not registered.

The element objects displayed on the display screen 50 correspond to the positions of the element objects registered in the two-dimensional matrix table 40. Element objects of 3 lines by 2 columns (=6 element objects) can be displayed at a time on the display screen 50. Although six element objects can be displayed in this embodiment, the number of element objects, which can be displayed, may be any value.

The text registered in the position of the registration region 41L located on the left side of line 1 in the two-dimensional matrix table 40 is displayed on the left side of line 1 in the display screen 50. Likewise, the text in the registration region 41R is displayed on the right side of line 1 in the display screen 50, the simple icon of the image in the registration region 42L is displayed on the left side of line 2 in the display screen 50, the text in the registration region 42R is displayed on the right side of line 2 in the display screen 50, and the simple icon of the table in the registration region 43L is displayed on the left side of line 3 in the display screen 50. Since any element object is not registered in the registration region 43R, any element object or a simple icon thereof is not displayed on the right side of line 3 in the display screen 50.

The element objects or simple icons thereof registered in the positions of the registration regions 44L to 48L and 44R to 48R can be displayed on the display screen 50 by scrolling the screen.

The reason why (None) is registered in the registration region 43R or the like in the two-dimensional matrix table 40, is that any element object is not disposed for the reason of the original design of the input web contents, or that the following folding processing has been carried out by the relative position registration part 12.

Figure 3A:
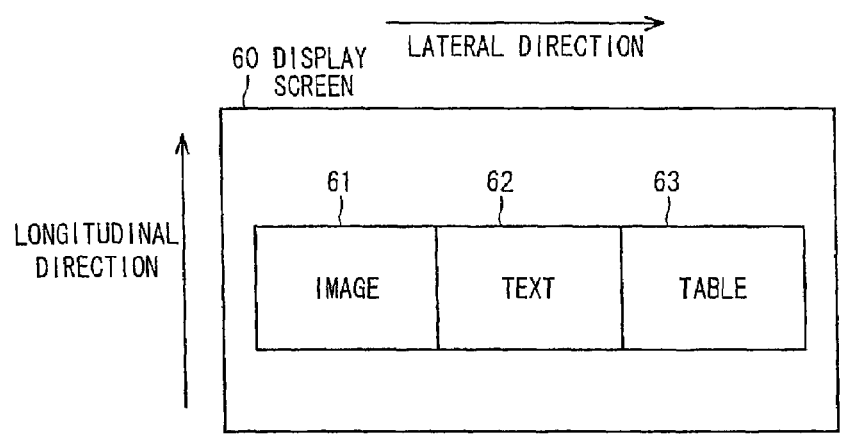
FIG. 3A is a diagram showing a display screen having a screen size large enough to display web contents in an original design in a preferred embodiment of the invention.
Figure 3B:
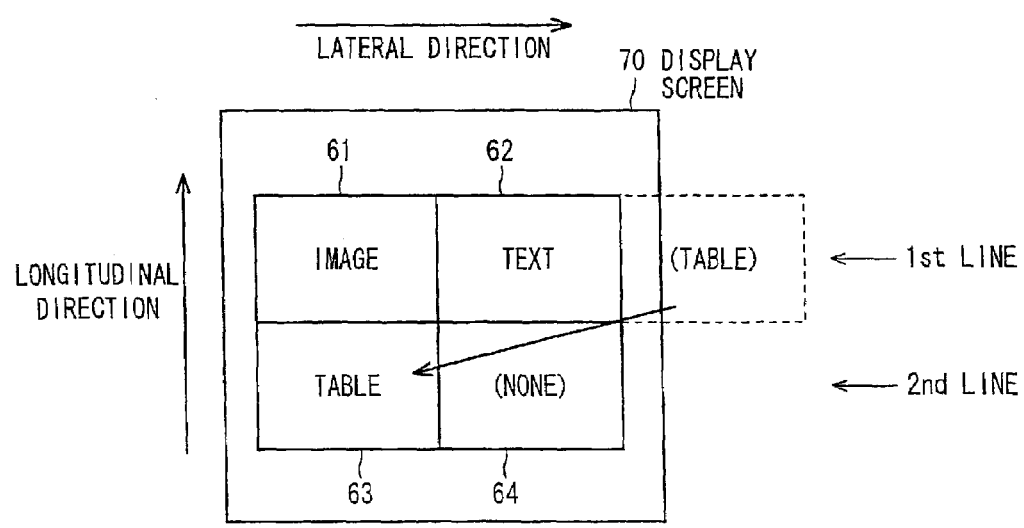
FIG. 3B is a diagram showing a display screen not having a screen size large enough to display web contents in an original design in a preferred embodiment of the invention.

FIG. 3 is a diagram showing folding processing by a terminal device 10 in a preferred embodiment of the invention. FIG. 3A is a diagram showing a display screen 60 having a screen size large enough to display web contents in an original design. FIG. 3B is a diagram showing a display screen 70 not having a screen size large enough to display web contents in an original design. The folding processing by the terminal device 10 in this preferred embodiment of the invention will be explained in conjunction with FIGS. 1 and 3.

The web contents comprises three element objects, that is, an image 61, a text 62, and a table 63. The three element objects are arrayed in a row in the lateral direction in the order of the image 61, the text 62, and the table 63 as viewed from the left. The display screen 60 has a size large enough to display the web contents in an original design. As shown in FIG. 3A, the element objects, that is, the image 61, the text 62, and the table 63, are displayed in that order as viewed from the left on the display screen 60.

On the other hand, the display screen 70 has a screen having a size which can display two or less element objects in the lateral direction. In the original design of the web contents, three element objects are arrayed in a row in the lateral direction. Therefore, the display screen 70 does not have a screen size large enough to display the web contents in an original design.

In the folding processing, a group of element objects, which have been displayed in one line, are displayed in two or more lines. In the display screen 70, upon the folding processing, the table 63 is transferred from the first line to the left side of the second line and is displayed in the second line. In the region 64 on the right side of the second line, there is no element object to be displayed, and, thus, a blank (None) is registered.

In the folding processing shown in FIG. 3B, the table 63 is transferred to and disposed on the left side of the second line. Alternatively, the table 63 may be transferred to the right side of the second line if this is close to the original design. When the table 63 is transferred to the right side of the second line, the left side of the second line is a blank. As explained above, in the processing method in this preferred embodiment, since the number of objects displayed in the horizontal direction is restricted due to the limitation of the display area, when the number of element objects arrayed is 3 or more, the relative position registration part 12 automatically carries out folding processing. This can realize the display of the whole original contents even when the display area is restricted.

Further, as described above, the detection of the object and the appearance relative position registration are repeated to perform the rendering of the contents. The display image is in the form of an array of the text and the simple icons rendering the element objects. This can realize a proper, easy-to-see, easy-to-read display even in the case of mobile terminals having a limited display area. The text is displayed in a display layer different from other element object. For example, the text is displayed in a display layer 1, and an element object other than the text is displayed in a display layer 2. The whole image can be provided by displaying the display layer 1 and the display layer 2 in a superimposed state.

The display unit 17 comprises a display and the like and displays input web contents. Specifically, the display unit 17 displays the display image of the element object prepared in the element object detector 11 on the position registered by the relative position registration part 12.

Among the element objects displayed on the display unit 17, the text is displayed in the original design (character). On the other hand, since element objects other than the text, such as images, tables, voice information, or pictures, are displayed by the simple icon, they are not rendered in the original web contents design.

After the display of the element objects, when a more detailed display of the object other than the text is desired, the user inclines the terminal device 10 toward the position of the display of the simple icon of the object for which the more detailed display is desired.

An inclination sensor 15 detects the inclination of the body of the terminal device 10. Upon the receipt of a signal indicating the detection of the inclination from the inclination sensor 15, the whole screen enlargement part 13 starts enlargement/regeneration processing of a predetermined element object displayed on the display unit 17.

The texts representing the respective element objects contain ID information indicating the position of the disposition of each element object on the matrix table. The whole screen enlargement part 13 inquires of the relative position registration part 12 based on the ID information within the texts representing the respective element objects currently displayed on the display unit 17 and determines an object to be enlarged from the matrix table managed by the relative position registration part 12.

Upon the determination of the object to be enlarged, the screen overlapping part 14 performs rendering processing based on the maximum size of the display area of the display unit 17, transmits the enlarged element object to the display layer 3, and performs a display in such a state that the layer 3 is superimposed on the layer 1 and the layer 2 and the background is opaque. The three display layers, the display layer 1, the display layer 2, and the display layer 3, are superimposed on top of one another, and the user sees only the display layer 3 which is the uppermost display layer.

In such a state that the element object is displayed in an enlarged state, the control unit 16 does not permit scrolling or other processing. The control unit 16 permits ordinary window operation only after return to the original state (screen on which the simple icon is displayed).

As soon as the user inclines the terminal device 10 in a direction opposite to the direction in which the terminal device 10 has been inclined at the time of enlargement, the element object, which has been subjected to enlargement processing, is returned to the display image before the enlargement processing (screen on which the simple icon is displayed). More specifically, the screen overlapping part 14 clears and discards the display layer 3, which has been produced by the screen overlapping part 14 per se, to render the display layer 1 and the display layer 2 underlying the display layer 3 visible.

Figure 4:
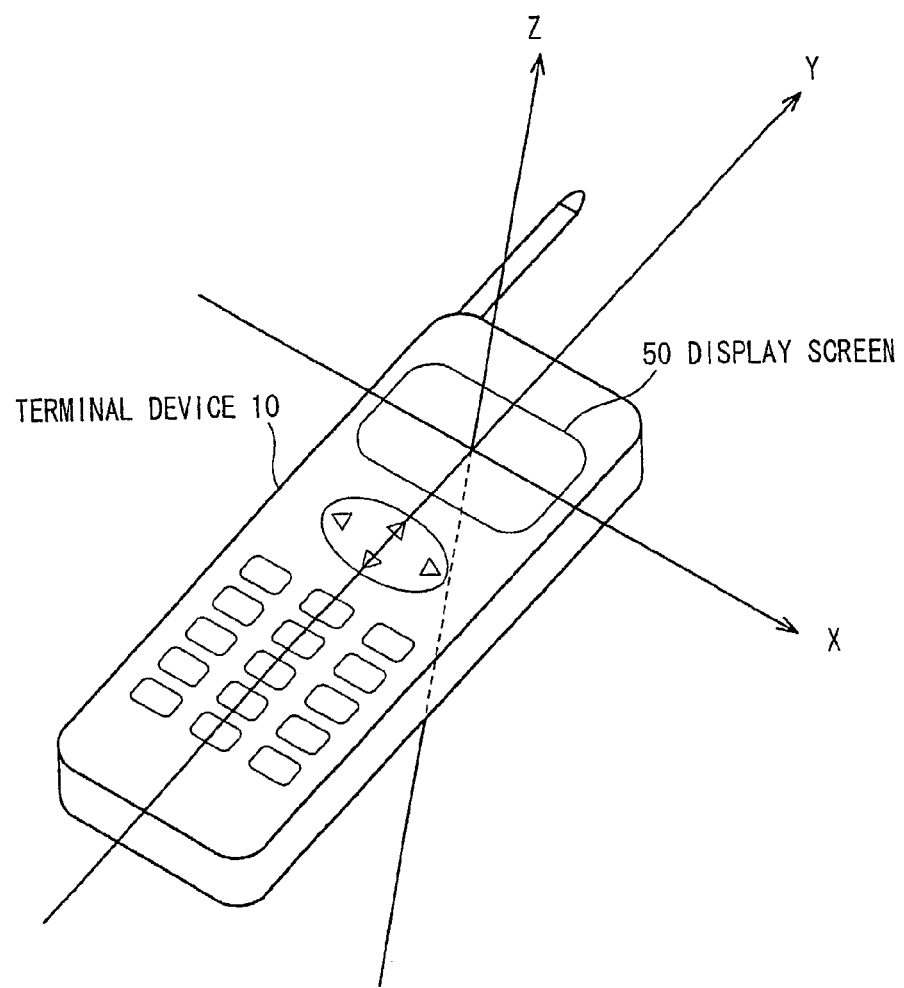
FIG. 4 is a diagram showing an inclination of a terminal device in a preferred embodiment of the invention.
Figure 5:
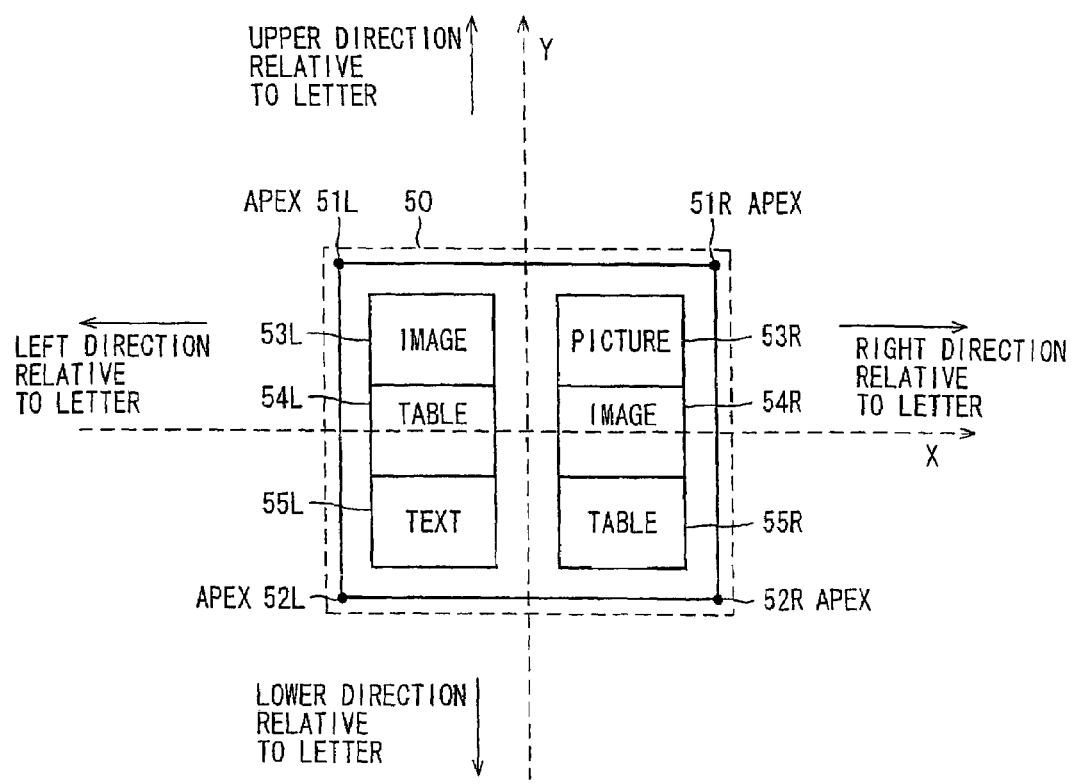
FIG. 5 is a diagram showing a display screen in a preferred embodiment of the invention.

FIG. 4 is a diagram showing the detection of the inclination of the terminal device 10 in a preferred embodiment of the invention. FIG. 5 is a diagram showing the display screen 50 in a preferred embodiment of the invention. The operation of the detection of the inclination of the terminal device 10 in a preferred embodiment of the invention will be explained in conjunction with FIGS. 1, 4, and 5.

As shown in FIG. 4, Z axis is taken parallel to gravity direction so that the gravity direction is a negative direction. The direction opposite to the gravity direction is a positive direction of the Z axis. XY orthogonal coordinates perpendicular to the Z axis are taken on a horizontal plane. The X, Y, and Z axes are orthogonal to one another at the origin. When the terminal device 10 is horizontally placed on the XY plane so that the display screen 50 side faces the positive side of Z, as shown in FIG. 5, the upper direction and the lower direction relative to characters, images or the like displayed on the display screen 50 are respectively the positive direction of the Y axis and the negative direction of the Y axis, while the right direction and the left direction relative to characters, images or the like are respectively the positive direction of the X axis and the negative direction of the X axis. The upper direction, the lower direction, the left direction, and the right direction relative to characters, images or the like will be hereinafter referred to simply as "upper direction," "lower direction," "left direction," and "right direction," respectively.

In this preferred embodiment, as shown in FIG. 5, the display screen 50 is in a rectangular form, and apexes in the display screen 50 are points 51L, 51R, 52L, and 52R. The points 51L, 51R, 52L, and 52R are equidistant from the origin (the intersection of XY axes). A side defined by the point 51L and the point 51R and a side defined by the point 52L and the point 52R are parallel to the X axis. A side defined by the point 51L and the point 52L and a side defined by the point 51R and the point 52R are parallel to the Y axis.

As shown in FIG. 5, element objects, that is, an image 53L, a picture 53R, a table 54L, an image 54R, a text 55L, and a table 55R, are displayed on the display screen 50. Any element object is not displayed in the region indicated by 55R.

Here as soon as the inclination sensor 15 detects that the terminal device 10 has been inclined in the right direction, that is, that the value of the Z coordinate of the point 51R is smaller than the value of the Z coordinate of the point 51L and the difference in value of the Z coordinate between the points 51R and 51L is not less than a predetermined value, the whole screen enlargement part 13 and the screen overlapping part 14 enlarge/regenerate the element object (picture 53R) located at the uppermost position among the element objects located in the right direction relative to the Y axis (picture 53R, image 54R, and table 55R).

On the other hand, as soon as the inclination sensor 15 detects that the terminal device 10 has been inclined in the left direction, that is, that the value of the Z coordinate of the point 51L is smaller than the value of the Z coordinate of the point 5IR and the difference in the value of the Z coordinate between the points 51L and 51R is not less than a predetermined value, the whole screen enlargement part 13 and the screen overlapping part 14 enlarge/regenerate the element object (image 53L) located at the uppermost position among the element objects located in the left direction relative to the Y axis (image 53L, table 54L, and text 55L).

In this preferred embodiment, the inclination of the terminal device 10 is detected based on the positional relationship between the points 51L and 51R. Alternatively, the inclination may be detected based on the positional relationship between the points 52L and 52R. Further, the inclination of the terminal device 10 may be detected on other basis.

During the display of the enlarged/regenerated element object, when the terminal device 10 is inclined in a direction (right/left direction) opposite to the direction in which the terminal device 10 has been inclined at the time of enlargement/regeneration processing, the element object enlarged/regenerated screen is returned to the original screen on which the simple icon is displayed.

As shown in FIG. 5, when a plurality of element objects are displayed in the right/left direction relative to the Y axis, after enlargement/regeneration processing of the element object located at the uppermost position, the operation of a predetermined key provided in the operating part 19 permits enlargement/regeneration processing of element objects other than the element object located at the uppermost position.

Figure 6:
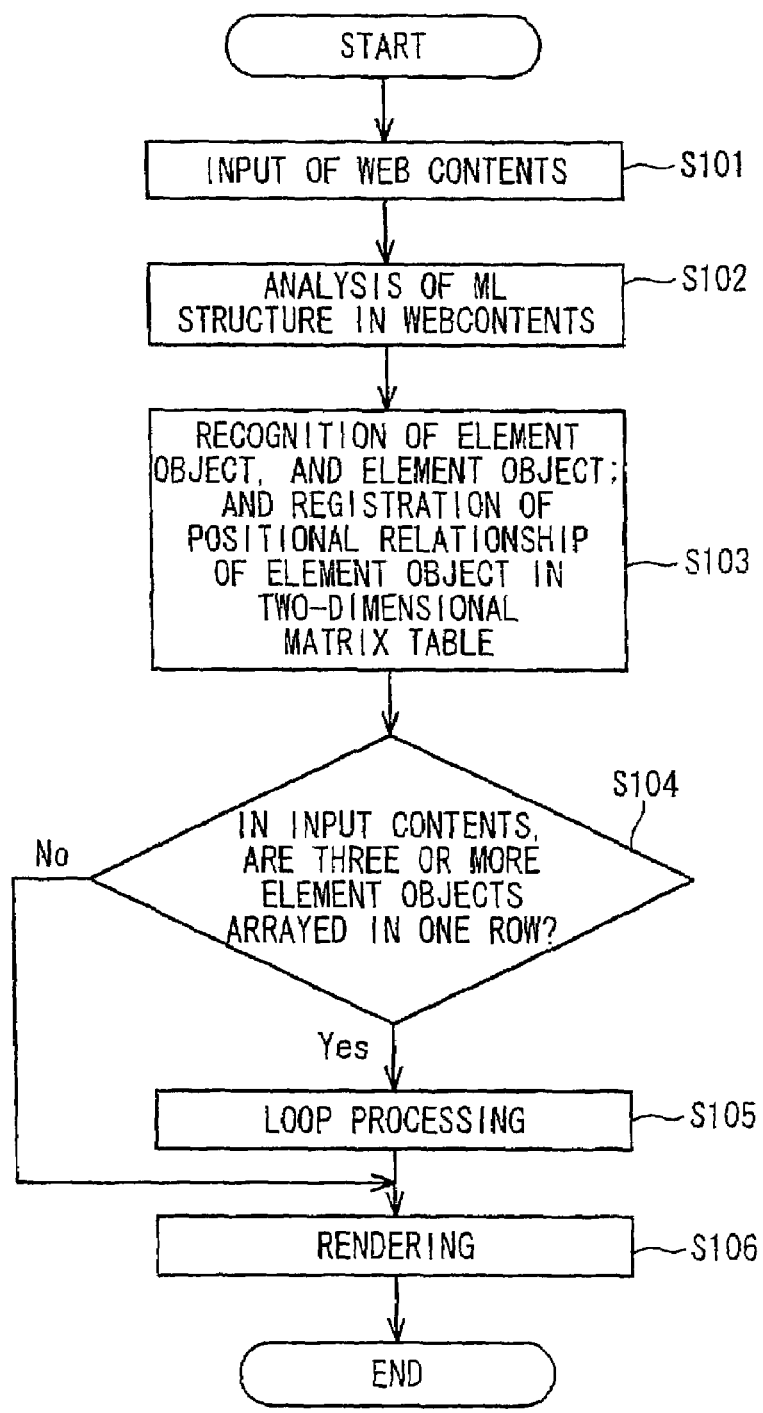
FIG. 6 is a flow chart showing the flow of a web contents display operation by a terminal device in a preferred embodiment of the invention.

FIG. 6 is a flow chart showing the flow of display operation of web contents in the terminal device 10 in a preferred embodiment of the invention. The display operation of the web contents in the terminal device 10 in the preferred embodiment of the invention will be explained in conjunction with FIGS. 1 and 6.

At the outset, upon the receipt of web contents (step S101), the input part 18 sends the received web contents to the element object detector 11.

The element object detector 11 analyzes ML structure in the web contents received from the input part 18 (step S102).

Based on the results of the analysis of the ML structure, the element object detector 11 recognizes the element objects contained in the web contents and produces display image (texts or simple icons) for displaying the recognized element objects on the display unit 17. At the same time that the element object detector 11 produces the display image, the relative position registration part 12 registers, in the two-dimensional matrix table managed by the relative position registration part 12 per se, the positional relationship in the display of the element objects on the display unit 17 (step S103).

Here the control unit 16 makes a judgment on whether or not, in the original design of the input web contents, three or more element objects are arrayed in a row in the lateral direction (in left/right direction) (step S104). When the result of the judgment is that the number of element objects arrayed in a row in the lateral direction is 2 or less (step S104/No), the element object detector 11 and the relative position registration part 12 perform rendering (step S106).

On the other hand, when the result of the judgment is that the number of element objects arrayed in a row in the lateral direction is three or more (step S104/Yes), the relative position registration part 12 performs folding processing (step S105). After the folding processing, the element object detector 11 and the relative position registration part 12 perform rendering (step S106). Thus, the terminal device 10 completes web contents display operation.

Figure 7:
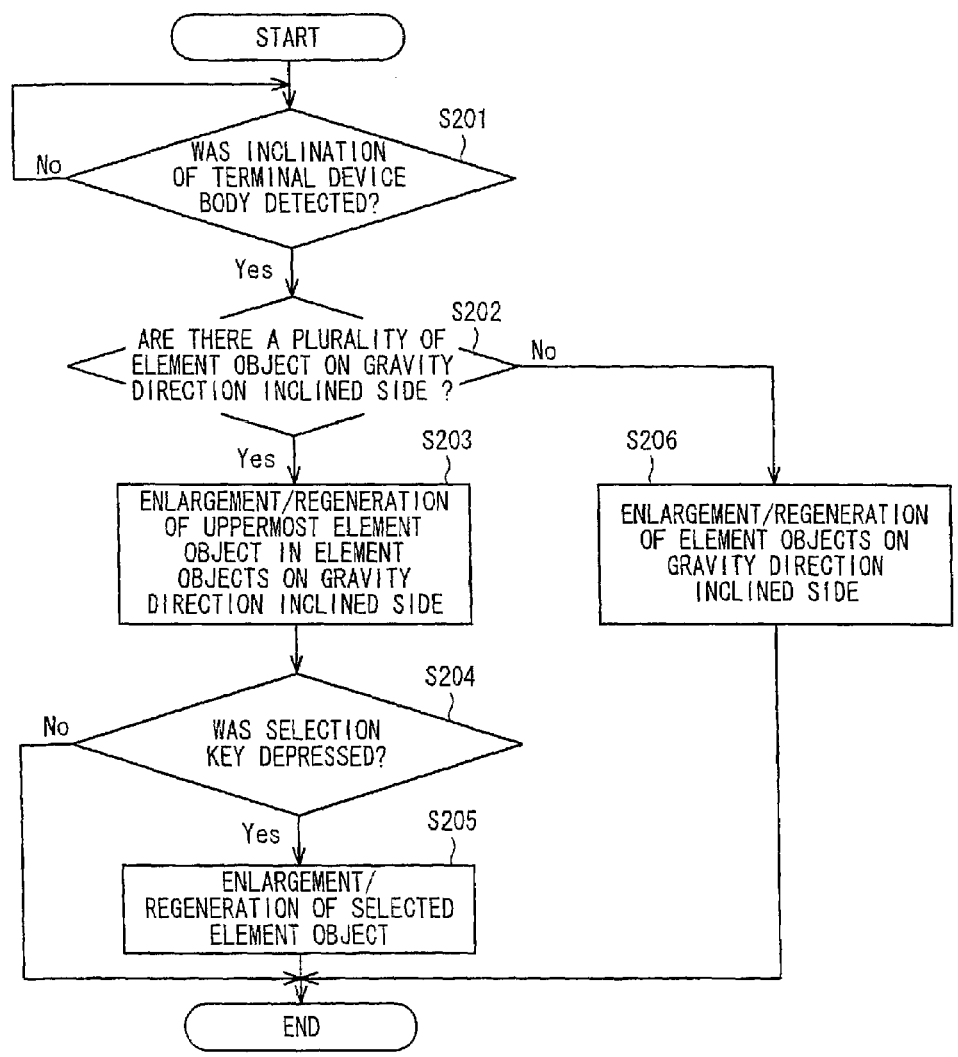
FIG. 7 is a flow chart showing the flow of the enlargement/regeneration operation of element objects by a terminal device in a preferred embodiment of the invention.

FIG. 7 is a flow chart showing the flow of enlargement/regeneration operation of element objects in the terminal device 10 in a preferred embodiment of the invention. Enlargement/regeneration operation of element objects in the terminal device 10 in the preferred embodiment of the invention will be explained in conjunction with FIGS. 1 and 7.

The inclination sensor 15 makes a judgment on whether or not the body of the terminal device 10 is inclined in the right/left direction (step S201). When the result of the judgment is that the body of the terminal device 10 is not inclined in any of the right and left directions (step S201/No), the processing of step S201 is repeated.

On the other hand, when the result of the judgment by the inclination sensor 15 is that the body of the terminal device 10 is inclined in any one of the right and left directions (step S201/Yes), the control unit 16 makes a judgment on whether or not a plurality of element objects are present on the display unit 17 in its area on the side which is inclined in the gravity direction (step S202).

When the result of the judgment is that only one element object is present on the display unit 17 in its aside (right/left side) which is inclined in the negative direction of the Z axis (step S202/No), the whole screen enlargement part 13 and the screen overlapping part 14 enlarge/regenerate the element object (simple icon) displayed on the display unit 17 in its inclined side (step S206).

On the other hand, when the result of the judgment is that a plurality of element objects are present on the display unit 17 in its side which is inclined in the negative direction of the Z axis (step S202/Yes), the whole screen enlargement part 13 and the screen overlapping part 14 enlarge/regenerate the element object displayed at the uppermost position among the plurality of element objects displayed on the display unit 17 in its inclined side (step S203).

The control unit 16 makes a judgment on whether or not, during the enlargement/regeneration processing of the element object in the step S203, the selection key provided in the operating part 19 has been operated (step S204). When the result of the judgment is that the selection key has not been operated (step S204/No), the terminal device 10 completes the operation.

On the other hand, when the result of the judgment is that the selection key has been operated (step S204/Yes), the whole screen enlargement part 13 and the screen overlapping part 14 enlarge/regenerate a simple icon selected by the selection key (step S205). Thus, the terminal device 10 completes the operation.

In this preferred embodiment, upon the detection of the inclination in the lateral direction based on the direction of the character, enlargement/regeneration processing of the simple icon and return processing are carried out. Alternatively, the inclination detection direction may be any one, and, for example, the inclination may be detected based on the vertical direction.

Further, in this preferred embodiment, after the enlargement/regeneration display of the element object, upon the detection of the inclination of the body of the terminal device in a direction opposite to the direction of inclination detected at the time of enlargement/regeneration (direction which is different by 180 degrees on the display screen), the state of the screen is returned to the display screen of the original simple icon. However, the direction of inclination detected at the time of returning may be other direction without limitation to the opposite direction.

As described above, in this preferred embodiment, the element object (simple icon) displayed on the right side or left side of the display screen 50 can be enlarged/regenerated by simple operation such that the terminal device 10 is inclined in the right or left direction relative to the display screen 50.

The terminal device 10 performs: processing for detecting element objects contained in input display information; processing for determining the display format of element objects based on the type of the detected element objects; processing for registering the display position of the detected element objects on a screen; processing for displaying the element objects on the screen; processing for detecting the inclination of the terminal device 10; processing for enlarging/regenerating the displayed element object based on the detected predetermined inclination of the terminal device 10; processing for returning the enlarged/regenerated element object to the display before the enlargement/regeneration upon the detection of inclination in another direction after the enlargement/regeneration of the element object; processing which, when the detected element object is a static image, a moving image, or voice information, converts the detected element object to an icon by which information inherent in the detected element object is simply displayed; and processing for setting the number of element objects, indicated in an icon form arrayed in the lateral direction on the screen, based on the display size of the screen. These processings are executed by a computer program provided in the terminal device 10. This program may be recorded on a recording medium, such as an optical disk or a magnetic disk so as to be loaded from the recording medium. Alternatively, the program may be loaded from an external equipment connected through a predetermined network.

As described above, according to the invention, element objects, such as images, tables, voice information, or pictures, which cannot be simultaneously displayed on a display screen having a limited display area without difficulties, are replaced by and displayed in the form of simple icons. Therefore, even in the display screen having a limited display area, the web contents can be entirely displayed without thinning.

Further, according to the invention, the user can easily recognize the whole element object by simple operation in such a manner that the terminal device is inclined in a predetermined direction to enlarge/regenerate the display (simple icon) which simply indicates the contents of the element object.

Furthermore, according to the invention, after the inclination of the terminal device in a predetermined direction to enlarge/regenerate the simple icon, the screen is returned to the original state such that the original simple icon is displayed by simple operation such that the body of the terminal device is inclined in other direction, for example, a direction opposite to the predetermined direction.

Furthermore, according to the invention, when the display area of the display screen is limited, all the element objects constituting the web contents can be displayed in an easy-to-see form by folding processing of the element objects.

Furthermore, according to the invention, when element objects constituting input web contents are displayed, the element objects constituting the web contents can be displayed in an easy-to-see form by properly setting the row of element objects (the number of element objects displayed) in the lateral direction based on the original design/layout of the web contents.

The invention has been described in detail with particular reference to preferred embodiments, but it will be understood that variations and modifications can be effected within the scope of the invention as set forth in the appended claims.

What is claimed is:

1. A terminal device comprising:
   element object detection means for detecting element objects contained in input display information;
   display format determination means for determining the display format of the element objects based on the type of the element objects detected by the element object detection means;
   display position registration means for registering the display position of the element objects, detected by the element object detection means, on a screen;
   element object display means for displaying the element objects on the screen based on the display format determination means and the display position registration means;
   inclination detection means for detecting the inclination of the terminal device;
   element object enlargement/regeneration means for enlarging/regenerating the displayed element object based on the predetermined inclination detected by the inclination detection means; and
   display returning means for returning the display to a size before enlargement/regeneration, when the inclination detection means detects an inclination of the terminal device in another direction.

2. The terminal device according to claim 1, wherein, upon the detection of inclination in a direction opposite to the predetermined direction, the display returning means returns the enlarged/regenerated element object to the display before the enlargement/regeneration.

3. An information display method comprising the steps of:
   detecting element objects contained in input display information (element object detection step);
   determining the display format of the element objects based on the type of the element objects detected by the element object detection step (display format determination step);
   registering the display position of the element objects, detected by the element object detection step, on a screen (display position registration step);
   displaying the element objects on the screen based on the display format determination step and the display position registration step (element object display step);
   detecting the inclination of a terminal device (inclination detection step);
   enlarging/regenerating the displayed element object based on the predetermined inclination detected by the inclination detection step; and
   display returning step for returning the display to a size before enlargement/regeneration, when the inclination detection step has detected an inclination of the terminal device in another direction.

4. The information display method according to claim 3, wherein, upon the detection of inclination of the terminal device in a direction opposite to the predetermined direction, the display returning step returns the enlarged/regenerated element object to the display before the enlargement/regeneration.

* * * * *